March 23, 1943.  C. E. BODEY, JR  2,314,477
WELL SCREEN HAVING WATER CONTACTING SURFACE FORMED OF PLASTIC MATERIAL
Filed Nov. 25, 1940  3 Sheets-Sheet 1
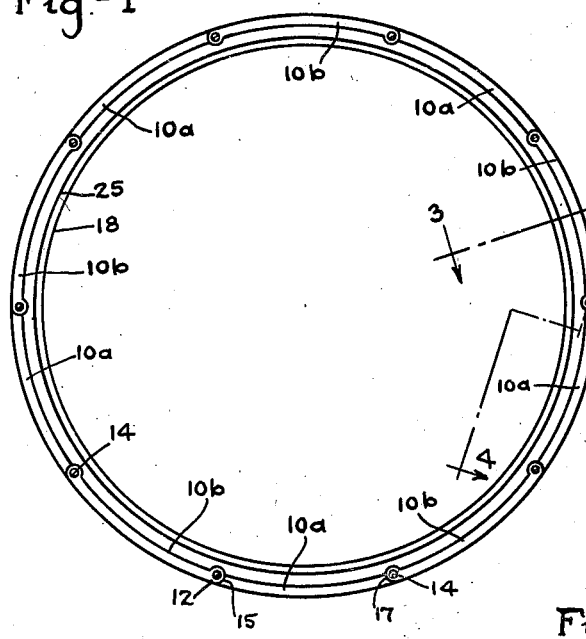
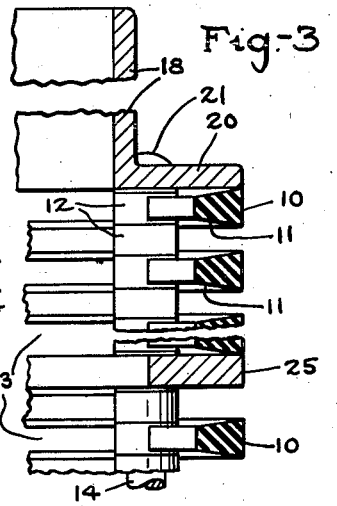
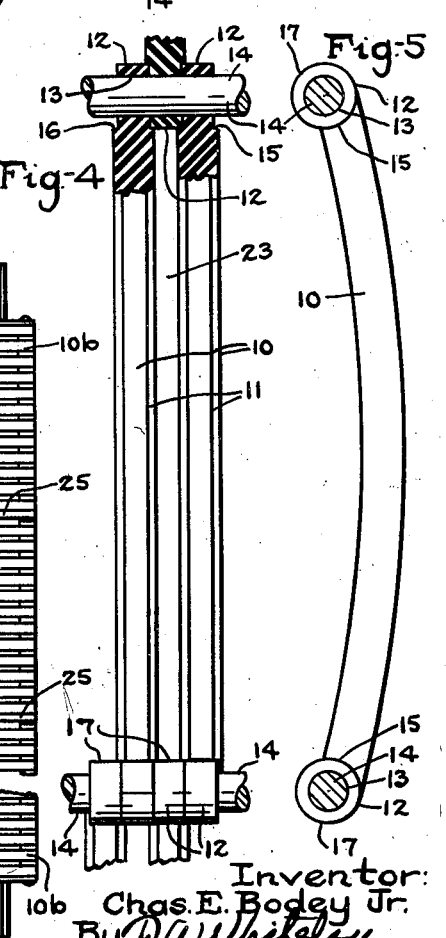
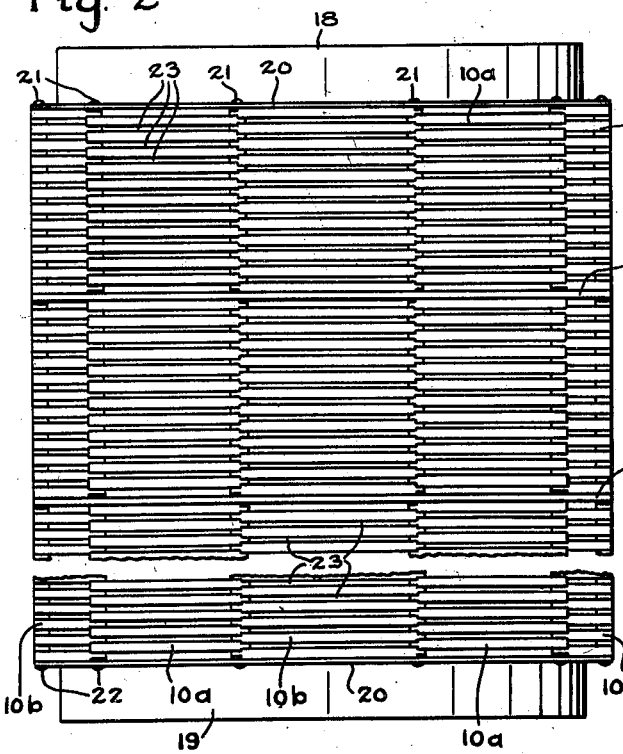
Inventor:
Chas. E. Bodey Jr.
By M.G. Whiteley
Attorney March 23, 1943.  C. E. BODEY, JR  2,314,477
WELL SCREEN HAVING WATER CONTACTING SURFACE FORMED OF PLASTIC MATERIAL
Filed Nov. 25, 1940   3 Sheets-Sheet 2.
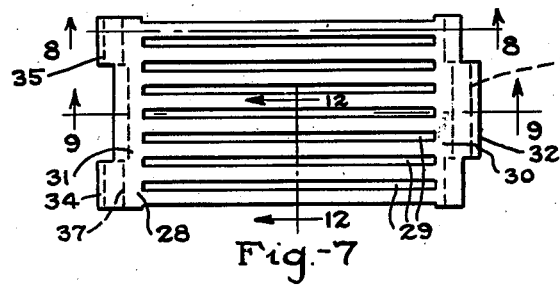
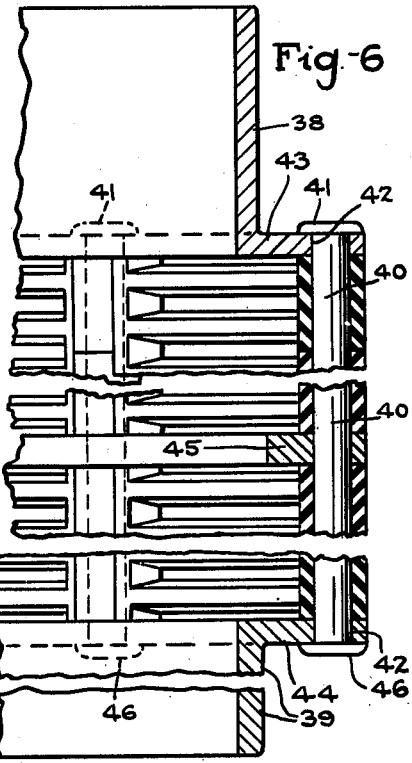
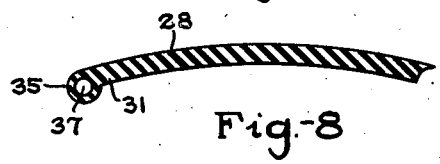
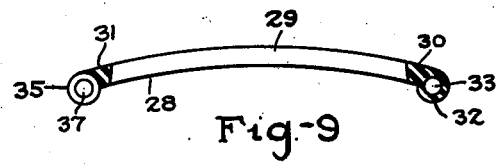
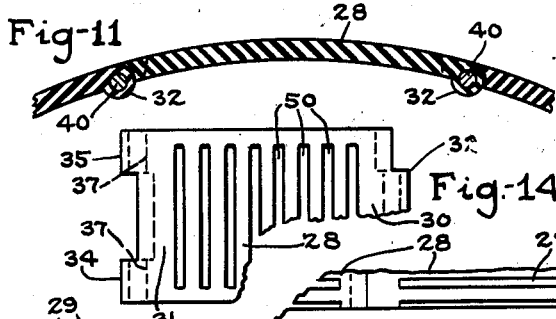
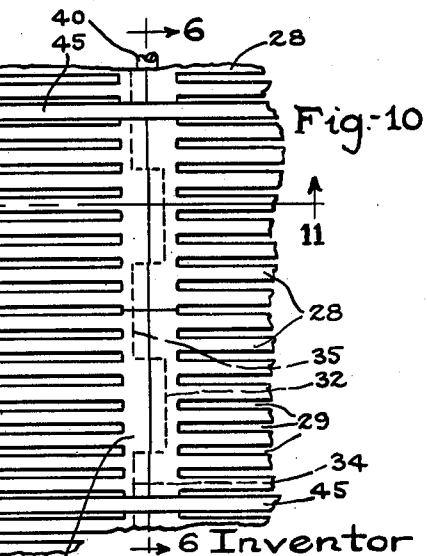
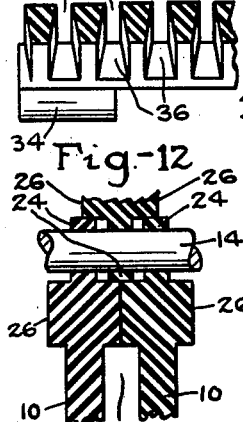
Inventor
Chas. E. Bodey Jr.
By [signature]
Attorney

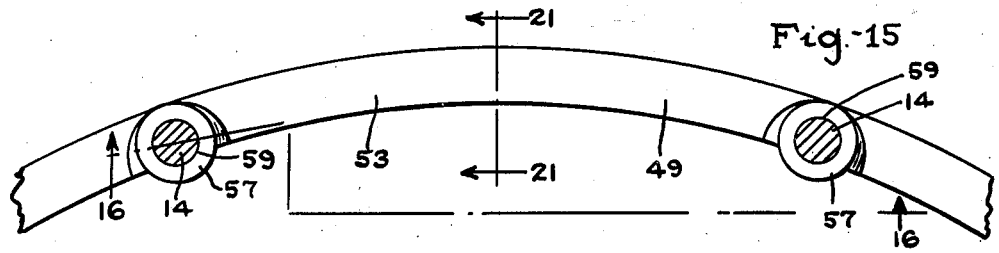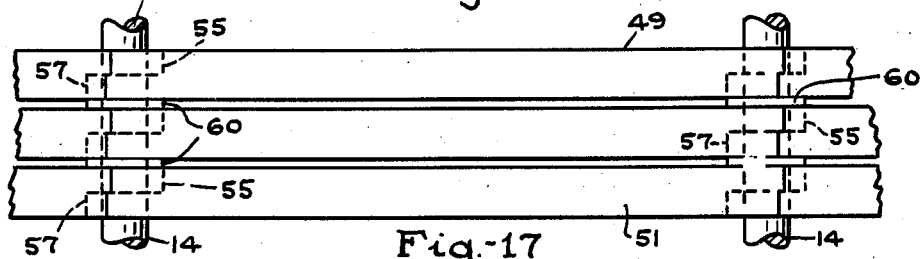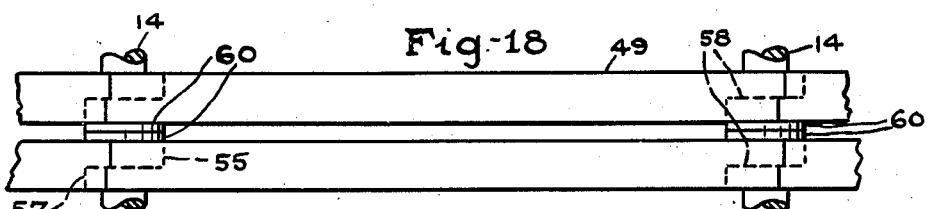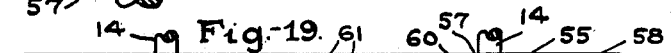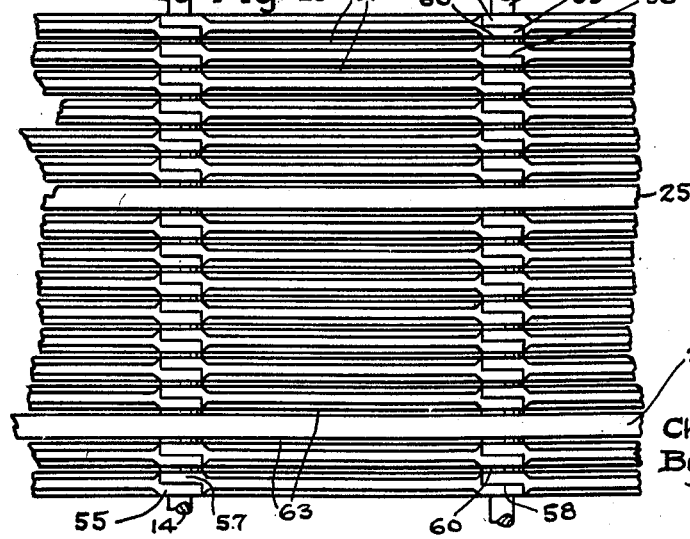

Patented Mar. 23, 1943

2,314,477

UNITED STATES PATENT OFFICE 2,314,477

WELL SCREEN HAVING WATER CONTACTING SURFACES FORMED OF PLASTIC MATERIAL

Charles E. Bodey, Jr., St. Paul, Minn., assignor to Edward E. Johnson, Incorporated, St. Paul, Minn.

Application November 25, 1940, Serial No. 366,980

6 Claims. (Cl. 166—5)

My invention relates to well screens having water contacting surfaces formed of plastic material, and has for its principal object to provide a screen structure made up of a multiplicity of pre-formed segment sections composed of plastic material such as Bakelite or other strong like plastic, said sections being constructed and arranged so that they are held together by a simple form of strong metal connectors the metal being imbedded in or covered by the plastic substance of which the segment sections are composed, and supporting rings.

Heretofore well screens have been formed of various types of metal, almost universally in the form of cylinders either of solid metal with drainage slots formed in the body of said metal or of metallic supporting members, such as rods or the like, with a wrapping of some kind of wire securing to the rods in various ways, such as by welding, by soldering, or by insertion in transverse grooves formed in the supporting members, sometimes accompanied by deformation of the metal to caulk or otherwise hold the wrapping wire in position. In the use of such all-metallic screens serious trouble is encountered by reason of the corrosive action of the water or water solutions flowing over the exposed portions of the metal. This corrosive action frequently results in very rapid deterioration of the screening surface so that the life of such screens is greatly shortened. I have discovered that by employing a rigid and strong type of plastic material, such as certain forms of Bakelite, corrosion and breaking down of the screening surface is avoided.

There have been, however, difficulties in the formation of a well screen of such plastic material arising from the fact that even though quite strong plastic material is available, and probably stronger plastic material may later be available, the material itself does not have sufficient strength to resist the strains to which a well screen must be subjected.

It is a principal object of my invention therefore to make a well screen having all screening surfaces of plastic material, by constructing a series of formed segment plates and providing them with securing means at their ends, the plates being so formed that when a suitable number of them are positioned and secured together a well screen of a satisfactory cross sectional shape will be formed having a sufficient area of drainage slots of predetermined widths, said drainage slots and all their surfaces being composed of plastic material.

It is a further object of my invention to provide a well screen formed out of the aforesaid segment members united as above defined in combination with unbroken reinforcing metallic rings, which are applied to or strung upon the means such as rods securing the plastic material segment members, in such a way as to greatly stiffen and reinforce the screen structure when it is completed.

It is a further object of my invention to form the ends of the segment plates of plastic material with means for securing them together such that taken in conjunction with the curvature of the plates in the arc of a circle, a cylindrical or approximately cylindrical screen is provided.

It is a further object of my invention to provide a well screen formed of sets of segment plates composed of plastic material each of which has preformed therein a multiplicity of slots of desired width and extending in any desirable or suitable direction within said segment plates.

It is a further object of my invention to provide a well screen formed of plastic material slot-forming segment elements, whether single unslotted segments or multiple slot segments, with multiple interlocking end portions having transverse holes to receive metallic rods for holding the successive sets of segments together, and having metallic rings between certain of said head portions such as to cause the sets of segments when secured together to be maintained in a suitable cross sectional form approximating that of a cylinder.

It is a further object of my invention to provide a well screen formed of plastic material slot-forming segment elements which shall be of the same size and shape for different sizes of well screens, the interlocking of said elements forming said different sizes of well screens as a cylinder or slightly irregular-sided members approximating a cylinder.

It is a further object of my invention to provide a well screen having end fittings which may be threaded as male and female coupling members, and having annular flanges through which the aforesaid rods extend and to which they may be secured by riveting, with nuts, by welding, or otherwise, to produce a completed screen member.

The full objects and advantages of my invention will appear in connection with the detailed description thereof, and the novel features of construction which produce the advantageous results above referred to are particularly pointed out in the claims.

In the drawings illustrating an application of my invention in one form:

Fig. 1 is an end elevation view of a completed screen.

Fig. 2 is a plan view of the screen as shown in Fig. 1.

Fig. 3 is an enlarged fragmentary sectional view with parts broken away taken on line 3—3 of Fig. 1.

Fig. 4 is an enlarged fragmentary sectional view taken on line 4—4 of Fig. 1.

Fig. 5 is an enlarged view across the locking rods of one of the segment pieces used to form the screen.

Fig. 6 is an enlarged part fragmentary longitudinal view taken on line 6—6 of Fig. 10.

Fig. 7 is a front plan view of a plate segment formed with a multiplicity of drainage slots.

Fig. 8 is a section taken on line 8—8 of Fig. 7.

Fig. 9 is a section taken on line 9—9 of Fig. 7.

Fig. 10 is a plan view showing several sections united.

Fig. 11 is a section taken on line 11—11 of Fig. 10.

Fig. 12 is a sectional view taken on line 12—12 of Fig. 7.

Fig. 13 is a sectional view similar to a part of what is shown in Fig. 4 showing how dissimilar segment members of different widths of slots can be attained.

Fig. 14 is a front view of one of the composite segment members showing the drainage slots running parallel with the securing heads.

Fig. 15 is a side view of a form of link member which is a modification of the link member of Figs. 1 to 5 showing how these members are held by the metallic supporting members shown in section.

Fig. 16 is an inside edge view taken on line 16—16 of Fig. 15 with the rod and attached member at the right omitted.

Fig. 17 is an outside view of a number of segments united together showing the manner of forming the drainage slots by the use of washers strung on supporting rods.

Fig. 18 is a view similar to Fig. 17 showing how a plurality of washers may be employed to vary the width of the slots.

Fig. 19 is an inside view of a portion of a finished screen showing the use of the supporting rings.

Fig. 20 is a perspective view of one of the washers employed in spacing the members.

Fig. 21 is a sectional view taken on line 21—21 of Fig. 15 showing the cross sectional view of the segment piece which produces the inwardly diverging side walls.

As shown in Figs. 1 and 5, segment members 10 of solid cross section and composed of plastic material are formed in the arcs of a circle such that when a given number of said segments are united the outer limits of the united segments will outline a circle. But a single set of said segments will be employed for making several sizes of well screens. Obviously if less than the number to make a circle are employed the resulting cross section will be a cylindrical figure with a rough approximation of a circle in cross section for producing well screens of smaller sizes, if a larger number of segments are employed there will still be an approximation of a circle, but of a larger size than the true circle. In the description herein given it will be understood that all segments 10, and also slotted segments, later to be described, are formed of plastic material such as hard and strong Bakelite. All the rods for securing the parts together, the end fittings and the rings strung on the rods for holding the parts in the desired screen form will be of the strongest type of metal, such as a strong grade of steel.

The segments 10 are preferably V-shaped in cross section, as clearly indicated at 11 in Fig. 3. Each segment piece is provided with a head portion 12 which is circular in cross section and has therethrough a circular opening 13 adapted to receive a uniting rod 14. Each head 12 is narrower than the body of the segment piece 10 and is provided with shoulders 15 and 16, Fig. 4, which as shown in Fig. 5, are arcuate in form, that is, the shoulders 15 and 16 comprise arcs of circles corresponding to the circular outer contour 17 of the heads 12. As shown in Figs. 2 and 3, end fittings 18 and 19 are provided, each having an annular flange 20. The fittings 18 and 19 may, if desired, be internally and externally threaded to form male and female union members, which threading is not shown.

The fittings 18 and 19 have in their flanges 20 a plurality of holes corresponding in number with the holes 13 in the heads 12 of the segment pieces 10. These holes are spaced apart in the flanges 20 distances equal from center to center to the distances from center to center of the holes 13 of segment pieces 10, being thus adapted to receive the rods 14 which pass through the holes 13 in the heads 12 of said segment pieces 10.

The parts heretofore described are all manufactured separately and individually. In assembling these parts to obtain the finished screen, one of the heads, as head 18, has inserted through the openings therein rods 14 which have heads 21 thereon brought up against the flange 20. The segment pieces 10 are then strung upon the rods 14. Five of these pieces, indicated as 10a, respectively, Figs. 1 and 2, are directly in contact with or in nearest position spaced from flange 20 of fitting 18, and each being spaced from the other the distances of a full segment. The other five indicated as 10b are alternately spaced and contact the ends of the first five to extend along the spaces separating the several sets of ends of the segments 10a, all as clearly indicated in Fig. 2. Since it is desired to have one set of segments for different sizes of screens any number of pairs as four and four or six and six can be used for changing the size of the screen.

In the relative arrangement described, successive segments 10 will be strung upon the several rods 14 to make the screen of any length desired, which is determined by the length of rods 14. The several ends or heads 12 of shoulders 15 and 16 thereon will interlock, as clearly shown in the upper part of Fig. 4.

In order to maintain the circular rigidity of the resulting screen structure, fixed to begin with by the annular or circular flange 20 of fitting 18, at suitable intervals unbroken metal rings 25 formed with holes corresponding in position and number with the holes in the flanges 20 of fittings 18 and 19 are strung upon the rods 14, as clearly shown in Figs. 1, 2 and 3. These rings 25, as clearly shown, are deeper in cross section than the slot making segments 10 and when the entire structure is bound together will give a desired degree of circular rigidity to the completed screen. Obviously the number of rings and the depth and thickness of the rings can be regulated at will to meet any anticipated strain to which the screen may be subjected.

The assemblage, it will be noted, of the elements making up the screen is simply effected by ordinary common labor, since it is only necessary to string the several parts successively in proper order upon the rods 14. When this assembling has been carried out to the length of screen section desired the rods 14 are secured in fixed position by means of heads 22 indicated in Fig. 2, which may be drawn down with sufficient pressure by riveting or, if desired, by the use of nuts and nut locks. The resulting screen will thus be completely assembled to the length desired without the use of complicated welding machines or other mechanisms or appliances requiring heavy investment in capital account and expert mechanics to operate. The width of slots 23 resulting from this assemblage will of course be determined by the thickness of the head portions 12. When that thickness is made relatively great the slots will be wide; when it is made relatively small the slots will be correspondingly narrow.

In the modified form of Fig. 13 the heads 24 there shown may all be made narrow, and thickened portions 26 be provided with contacting faces, which thus produce slots 27 of the desired width. When this form is used the slots can at any time be narrowed by grinding off from the side walls of the thickened portions 26.

In the form of my invention of Figs. 6 to 12 inclusive the spacing members may be formed of arcuate strips 28 of considerable width with a multiplicity of slots 29 formed therein, as clearly indicated in Fig. 7. As shown in Fig. 12 the slots 29 will preferably widen inwardly, as indicated at 36 in Fig. 12. Heads 30 and 31 are formed on the ends of the arcuate members 28. Head 30 is provided with a central extension 32 formed with a transverse hole 33, and head 31 is formed with two extensions 34 and 35 spaced apart so as to straddle an extension 32 of a head 30. The extensions 34 and 35 are formed with holes 37 which come into alinement with the holes 33 in projecting portions 32, so that a rod or pin may be inserted through sets of alined holes 33 and 37 for each point of joinder end to end of plates 28.

In practice end fittings 38 and 39 provided with proper threading (not shown) are employed. In assembling the members to make a completed screen a suitable number of rods 40 provided with heads 41 are inserted through holes 42 in flanges 43 or 44 of either fitting 38 or 39, as shown with the head 41 being applied to the flange 43 of fitting 38. A suitable number of metal rings 45 are placed on the rods 40 between successive members 30 or between pairs of members 30 as shown in Fig. 10. The rods 40 then have applied thereto the second fitting or coupler member 44 and are headed as indicated at 46 so as to bind the assemblage firmly together. The resulting structure is, by means of fitting flanges 43 and 44 and rings 45, maintained in its pre-fixed form and the well screen is complete with drainage slots provided by the slots 29 in the member 28.

As shown in Fig. 14 the members 28 may have slots 50 extending at right angles to the greater length of member 30 or in effect as vertical slots along elements of the cylindrical or approximately cylindrical completed screen. The segment members 10 and 30 and the slots in member 30 may be formed in any desired manner, preferably by molding the plastic material directly into the shape and arrangement desired, although the slots in 30 may be cut from solid sheets if desired and the holes 13, 33 and 37 will in practice be drilled after the parts 10 and 13 are formed.

In the modification shown in Figs. 15 to 21 inclusive a special type of segment piece 49 is employed. This segment piece has its main body arcuate in edge plan with a flat top wall 51 and converging side walls 52 and 53, Figs. 16 and 20, thus having a keystone shaped cross section 54, as clearly shown in Fig. 21.

At one end of the segment 49 there is formed a head 55 and adjacent a cut-out portion 56, the head and cut-out portion being of the same width. At the other end of the segment 49 is another head 57 and a cut-out portion 58 which also are of the same width. It follows that the head 55 at one end is adapted to seat in a cut-out portion 58 at the opposite end of another segment and correspondingly the head 57 at the other end of the segment piece 49 is adapted to seat in cut-out portion 56 at the other end of segment 49.

All of the heads are provided with circular apertures 59 adapted to receive the supporting rods 14. Obviously since all of the heads and all of the cut-out portions are of the same width when pairs are assembled, as clearly indicated in Figs. 17 and 18, their side walls will fall in common planes throughout. In order to space to form the drainage slots I employ one or more metal washers 60, which may be of any desired thickness so that the width of the drainage slots may be conveniently and easily determined by the simple expedient of using thinner or thicker washers and using one or more of such washers.

The parts will be assembled on the supporting rods 14 in exactly the same manner as is done with the construction of Figs. 1 to 5. Intervening metallic bands 25 will be employed and the slots formed between sets of supporting rods 14 will be inwardly diverged, as clearly indicated at 61, Fig. 19, and with this form of union slots 63 may conveniently be formed adjacent the supporting rings 25. It will be obvious that this form of segment can be assembled rapidly and provide a very rigid union of the segment members at their heads and the resulting screen will provide a maximum of screening service.

It will be understood that all the segment pieces 49 are constructed entirely of bulk plastic material such as a relatively rigid form of Bakelite. The drainage slots thus have walls which are non-corrosive and do not tend to form excrescencies such as rust, which is true of practically every form of metallic drainage slots.

The advantages of my invention will be apparent from the foregoing description. A principal and fundamental advantage resides in the fact that a well screen is produced wherein the screen elements and the surfaces contacted by the liquid to be screened are substantially all of plastic material resistant to the action of corrosion which results from constant contact of many different liquids with metal parts. At the same time the organization of elements is such that the steel reinforcement, which has no part in the formation of the screen proper and does not enter into the screening slots or screening surfaces to any substantial degree, nevertheless so strengthens the fabricated and completed well screen that it may be handled and set into deep wells and subjected to the severe stresses which go with deep well screens and will successfully resist all such stresses.

A further important advantage of my well screen resides in the fact that the plastic material screening members such as members 10, 30 or 49 may be pre-fabricated in large quantities and maintained in stock, so that when a well screen of any required capacity is ordered it may be quickly assembled and forwarded to the purchaser, whereas other forms of well screens have to be worked up as an entirety after the order is received, requiring a great deal of time.

Other great advantages reside in the fact that the well screen of my invention may be fabricated complete without processes such as welding, soldering, and the like, and the assembly may be made with the use of unskilled labor, all of which greatly reduces cost.

But the most important feature of advantage of my well screen comes from the use of a material which will not corrode or become encrusted, in combination with means for reenforcing it so it will be strong enough to stand requisite strains, and thus the resulting life of efficient operation be tremendously prolonged.

I claim:

1. A well screen comprising a multiplicity of similar arcuate bars of plastic material such as Bakelite each formed with narrowed heads having openings therethrough, steel rods extending through said openings and holding adjacent ends in contact, the said bars being severally formed so that when so held they will form drainage slots between each pair thereof, and steel rings on said rods between sets of said bars so held for maintaining the arcuate bars in position to form a substantially cylindrical well screen.

2. A well screen comprising a multiplicity of members each formed of plastic material such as Bakelite and each having a conforming edge shape and having a multiplicity of drainage slots formed therein, each of said members also being formed with an apertured head at one end and a pair of apertured heads at the other end adapted to receive between them the first named apertured head, pins extending through the apertures of all heads in a line for securing a suitable number of said elements together at their several ends, and unbroken rings on said pins for holding said members when so secured to form a well screen.

3. A well screen comprising a multiplicity of separate elements formed of plastic material such as Bakelite each conforming in edge shape to an arc of the same circle, and longitudinal reenforcing members adapted to secure a considerable number of said elements together at corresponding sets of their ends to form a substantially cylindrical member of desired length, said elements being so shaped that when so secured all pairs of said plastic elements directly fronting each other will form between them inwardly extending drainage slots of a well screen of desired length formed entirely of plastic material, and circular members positioned on said reenforcing members at the ends of groups of said plastic elements for reenforcing the same circumferentially.

4. A well screen comprising a multiplicity of arcuate bars of plastic material such as Bakelite each formed with narrowed heads having openings therethrough and contact faces on the sides thereof, said bars being severally positioned so that each narrowed head is between the narrowed heads of two adjacent bars and the contact faces of each head are engaged by contact faces of other heads, whereby drainage slots are provided between each pair of bars, longitudinal rods extending through the end openings of said bars when so positioned for holding them in such position, and unbroken rings on said rods between sets of bars for holding and maintaining the assembled arcuate bars in position to form a substantially cylindrical well screen.

5. A well screen comprising a multiplicity of arcuate members each formed of plastic material such as Bakelite and each having a conforming edge shape and having formed therein a multiplicity of similarly positioned drainage slots, means securing a desired number of said members together edge to edge and end to end and to form a substantially cylindrical member of desired length, and a multiplicity of metallic unbroken rings united with said securing means between circumferential sets of the members for holding said members in their substantially cylindrical position to form a complete well screen.

6. A well screen comprising a multiplicity of similar elements each composed of plastic material such as Bakelite, and being formed so that when groups of said elements are held secured together end to end and in tiers they will form a hollow well screen member with drainage slots between adjacent pairs of said members, longitudinal rods of steel extending through and held within the plastic material forming the abutting ends of said members, and steel rings on said rods between pairs of said members at spaced intervals along the lengths of the rods, whereby the plastic material will be reenforced to resist service strains.

CHARLES E. BODEY, Jr.